United States Patent
Kuroda et al.

(10) Patent No.: US 6,842,282 B2
(45) Date of Patent: Jan. 11, 2005

(54) REFLECTION PROJECTION SCREEN

(75) Inventors: Kazumi Kuroda, Fujimi (JP); Koji Tanaka, Saitama (JP); Yoshio Wakabayashi, Kawaguchi (JP); Tatsufumi Fukuda, Ageo (JP)

(73) Assignee: Arisawa Mfg. Co., Ltd., Joetsu (JP)

( * ) Notice: Subject to any disclaimer, the term of this patent is extended or adjusted under 35 U.S.C. 154(b) by 0 days.

(21) Appl. No.: 10/257,291

(22) PCT Filed: Feb. 14, 2002

(86) PCT No.: PCT/JP02/01260
§ 371 (c)(1),
(2), (4) Date: Oct. 11, 2002

(87) PCT Pub. No.: WO02/065208
PCT Pub. Date: Aug. 22, 2002

(65) Prior Publication Data
US 2003/0137728 A1 Jul. 24, 2003

(30) Foreign Application Priority Data
Feb. 14, 2001 (JP) .......................... 2001-79403

(51) Int. Cl.⁷ .............................................. G03B 21/56
(52) U.S. Cl. ..................................................... 359/449
(58) Field of Search ................................. 359/449, 450, 359/452, 461, 443

(56) References Cited

U.S. PATENT DOCUMENTS

| | | | | |
|---|---|---|---|---|
| 3,510,197 A | * | 5/1970 | Seki et al. ................... | 359/461 |
| 3,942,868 A | * | 3/1976 | Hoffbauer et al. ........... | 359/461 |
| 5,400,178 A | * | 3/1995 | Yamada et al. .............. | 359/449 |
| 5,751,387 A | | 5/1998 | Iigahama et al. | |
| 6,304,703 B1 | * | 10/2001 | Lowry .......................... | 359/451 |
| 6,466,369 B1 | * | 10/2002 | Maddock ..................... | 359/461 |
| 2003/0107803 A1 | * | 6/2003 | Tanaka et al. ............... | 359/460 |

FOREIGN PATENT DOCUMENTS

| | | |
|---|---|---|
| JP | 6-75303 A | 3/1994 |
| JP | 11-338056 A | 12/1999 |
| JP | 2000-206620 A | 7/2000 |
| JP | P2000-206620 A | 7/2000 |
| JP | 2002-19385 A | 1/2002 |

* cited by examiner

*Primary Examiner*—Christopher Mahoney
(74) *Attorney, Agent, or Firm*—Birch, Stewart, Kolasch & Birch, LLP

(57) ABSTRACT

A front projection screen (S) has a front shading sheet (5) facing a viewing side (A), and formed of a transparent material. The front shading sheet (5) has a front surface facing the viewing side (A), provided with a plurality of horizontal, parallel, minute ridges (8) having a triangular cross section and each having an upper side surface coated with a shading layer (9). A transparent filler layer (13) of a material having a refractive index nearly equal to that of the transparent material of the front shading sheet (5) is formed on the rear surface (4) of the front shading sheet (5), transparent glass beads (12) are embedded uniformly in a plane in the rear surface of the transparent filler layer (13), the rear surface of the transparent filler layer (13) is coated with a white, reflecting adhesive layer (11), and an opaque film (10) impermeable to light is applied to the rear surface of the reflecting adhesive layer (11). Horizontal end parts of an image displayed on the front projection screen (S) do not become dark, the front projection screen (S) has a large viewing angle, does not reflect an environmental image even in a light environment, and is capable of displaying a high-definition image having a high black level and a high contrast.

7 Claims, 8 Drawing Sheets

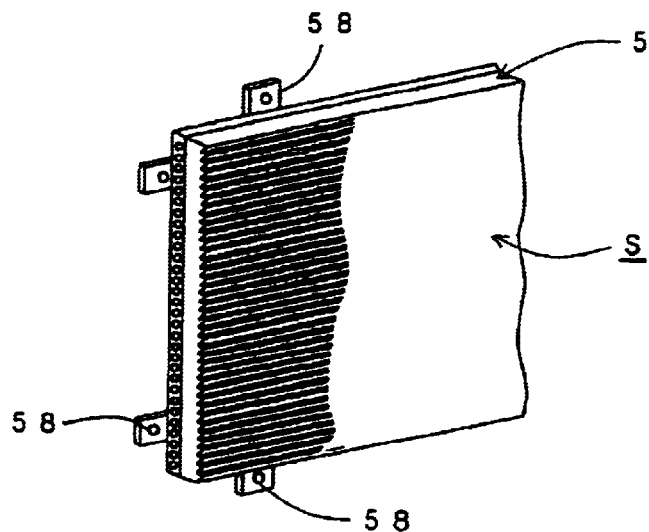
F I G. 12
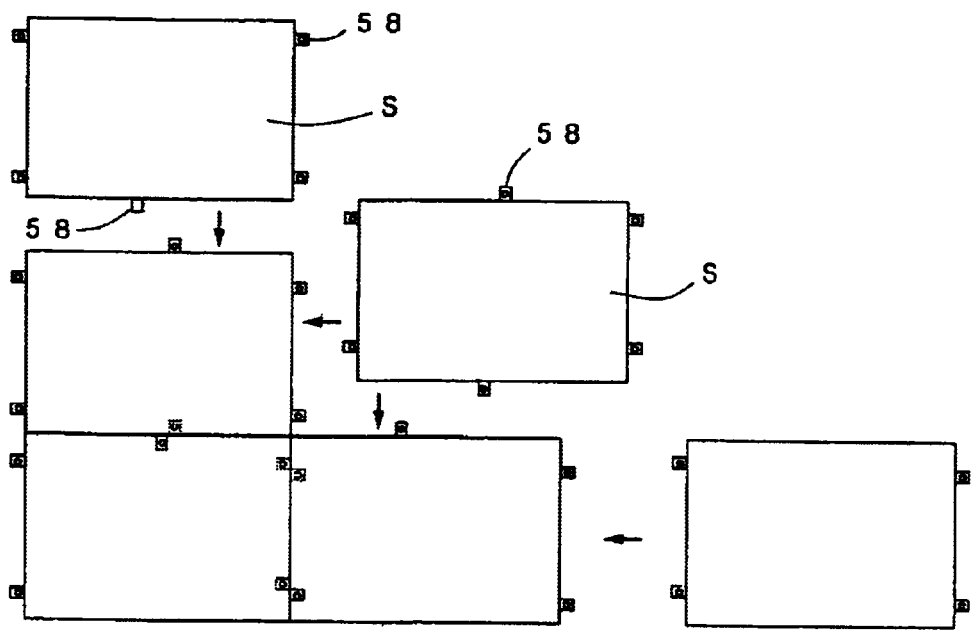
F I G. 13

REFLECTION PROJECTION SCREEN

This application is the national phase under 35 U.S.C. §371 of PCT International Application No. PCT/JP02/01260 which has an International filing date of Feb. 14, 2002, which designated the United States of America.

TECHNICAL FIELD

The present invention relates to a front projection screen that displays a image projected by an image-projecting device, such as a slide projector, a liquid crystal projector or a moving picture projector.

BACKGROUND ART

Front projection screens for displaying images projected by a projector include white matrix screens, chemical etching screens, and high-luminance bead screens. When an image is projected on such a screen by a projector in a well-lighted room, the image cannot be displayed clearly due to the reduction of contrast or the loss of color balance. Therefore, room lights of the room must be turned off to darken the room. When images are projected on a high-luminance bead screen by a high-luminance projector, a person is made to feel pains in the eyes by the glare of beads due to light regression when the person watches images displayed on the high-luminance bead screen for a long time. The term "light regression" signifies return of imaging light in a direction opposite to the traveling direction of projected imaging light.

A composite screen proposed in JP-A No. 206620/2000 is capable of displaying an image of an excellent color balance without reducing the contrast of the image even in a light environment without requiring room lights to be turned off. This prior art composite screen is constructed by disposing a generally transparent, front shading sheet near a surface of a conventional front projection screen on the viewing side. The front shading sheet is provided with a plurality of horizontal, parallel, minute ridges having a triangular cross section in its front surface, and a shading layer is formed on one of the two sides of each ridge having a triangular cross section.

FIGS. 14 and 15 show a composite screen of the same construction as the screen disclosed in JP-A No. 206620/2000, formed by disposing a glass bead front projection screen analogous with a front projection screen embodying the present invention behind a front shading sheet. As shown in FIGS. 14 and 15, a front projection screen 33 is formed by bonding transparent glass beads 32 to the front surface of an opaque sheet 30 with a white, reflective adhesive layer 31. A front shading sheet 35 of a transparent material is disposed on the viewing side A of the front projection screen 33 such that an air gap 36 is formed between the front surface of the front projection screen 33 and the front shading sheet 35 to enable viewing images of an excellent color balance without reducing the contrast of images even in a light environment without turning off room lights. The front shading sheet 35 is provided with a plurality of horizontal, minute ridges 38 having a triangular cross section in its front surface, and a black shading layer 39 is formed on an upper side surface of each minute ridge 38. The front shading sheet 35 enables viewing images of an excellent color balance without reducing the contrast of the images owing to effects explained in JP-A No. 206620/2000 and to be explained later.

No problem arises when a person views an image displayed on the composite screen shown in FIGS. 14 and 15 from a position in front of a central part of the composite screen. However, if a person views obliquely an image displayed on the composite screen from a position at a viewing angle greater than a certain horizontal viewing angle of, for example, 140°, a peripheral part of the image displayed on the composite screen darkens, a part of the image disappears, and the viewing angle narrows.

Reasons for such problems will be described with reference to FIGS. 14 and 15. Referring to FIG. 15, imaging light rays R1 projected by a projector P disposed on the viewing side A travel straight through the front shading sheet 35, penetrate into the transparent glass bead 32, are reflected by the back surface of the transparent glass bead 32. The reflected imaging light rays emerge from the glass bead 32, travel through the air gap 36, enter the front shading sheet 35, are refracted by the front shading sheet 35, and emerge forward from the front shading sheet 35 in the directions of the arrows R2, R3, R4, R1, R5, R6 and R7. Thus, persons in a region between the arrows R2 and R7 are able to see an image formed by the imaging light rays projected by the projector P.

The imaging light rays represented by the arrows R2, R3, R4, R1, R5, R6 and R7 include a large quantity of light including vertical components in addition to horizontal components. When such imaging light rays are reflected by the back surface of the transparent glass bead 32, reflected light rays including both vertical components and horizontal components penetrate into the front shading sheet 35. Some of the reflected light rays incident on the front shading sheet 35 fall on the lower surface of the black shading layer 39 as shown in FIG. 14. The reflected light rays fallen on the lower surface of the black shading layer 39 are reflected totally on to the rear surface 41 of the front shading sheet 35 as indicated by the arrow Rt. The reflected rays are reflected again by the rear surface 41 and travel forward in the direction of the arrow Rt from the front shading sheet 35. Most of the reflected light rays fallen on the rear surface 41 at incident angles smaller than the critical angle travel rearward through the rear surface 41, while the reflected light rays fallen on the rear surface 41 at incident angles greater than the critical angle are totally reflected by the rear surface 41. Therefore, all the light rays Rt that emerge from parts of the front shading sheet 35 horizontally apart from the center of the front shading sheet 35 are reflected in a total reflection mode by the rear surface 41.

The light rays Rt reflected by the rear surface 41 in a total reflection mode are dark light rays reflected by the lower surface of the black shading layer 39. Those dark light rays make an image formed by the light regressed from the transparent glass bead 32 turbid. It will be understood from the foregoing explanation that the dark light rays Rt emerge from parts horizontally apart from the center of the front shading sheet 35 because the light rays Rt fall on the rear surface 41 of the front shading sheet 35 at incident angles greater than the critical angle. Consequently, horizontal end parts of the image look dark to persons viewing the image from positions corresponding to horizontal end parts of the front shading sheet 35. The light rays Rt include both vertical components and horizontal components as a matter of course, the fact that the parts of the image displayed on horizontal end parts of the front shading sheet 35 look dark signifies that the viewing angle is small because it is possible that the viewing position changes greatly in horizontal directions while the viewing position does not change greatly in vertical directions.

Accordingly, it is an object of the present invention to solve problems that darkens part of a front projection screen, and to provide a front projection screen having a large viewing angle, not reflecting an environmental image even in a light environment, and capable of displaying a high-definition image having a high black level and a high contrast.

DISCLOSURE OF THE INVENTION

The present invention provides a front projection screen comprising: a front shading sheet facing a viewing side, wholly formed of a transparent material, having a front surface facing the viewing side, provided with a plurality of horizontal, parallel, minute ridges having a triangular cross section and each having a side surface coated with a shading layer; and a reflecting screen disposed opposite to a rear surface, facing a rear side opposite to the viewing side, of the front shading sheet; wherein a transparent filler layer formed of a material having a refractive index equal or nearly equal to that of the transparent material of the front shading sheet is sandwiched between the front shading sheet and the reflecting screen to construct a composite sheet such that any air layer is not formed at least between the front shading sheet and the transparent filler layer.

The reflecting screen may include an opaque base sheet impermeable to light, a white, reflecting, adhesive layer formed on a front surface, facing the viewing side, of the base sheet, and many glass beads uniformly arranged on a front surface, facing the viewing side, of the white reflecting adhesive layer and formed of a material having a refractive index greater than that of the material of the transparent filler layer.

The reflecting screen may include an opaque base sheet, and a white, mat sheet applied to a surface, facing the viewing side, of the opaque base sheet.

In the front projection screen, the composite sheet may be flexible, and may be capable of being rolled in a roll and of being rolled out for use. The composite sheet may be flexible, and may be tautly set in a frame.

The composite sheet of the front projection screen is provided on its rear surface with holding means capable of detachably holding the composite sheet on a wall, and a large screen may be constructed by closely arranging a plurality of front projection screens identical with the composite sheet on a wall.

The front projection screen may further comprise connecting tabs projecting from sides of the composite sheet and capable of connecting the composite sheet to another identical composite sheet, and a large screen may be constructed by closely arranging a plurality of front projection screens identical with the front projection screen having the composite sheet provided with the connecting projections, and connecting together the plurality of front projection screens by the connecting tabs.

BRIEF DESCRIPTION OF THE DRAWINGS

FIG. 12 is a perspective view of a front projection screen in a sixth embodiment according to the present invention;

FIG. 13 is a view of assistance in explaining a large front projection screen formed by closely arranging a plurality of front projection screen elements identical with the front projection screen shown in FIG. 12;

BEST MODE FOR CARRYING OUT THE INVENTION

Preferred embodiments of the present invention will be described hereinafter with reference to the accompanying drawings.

Figure 1:
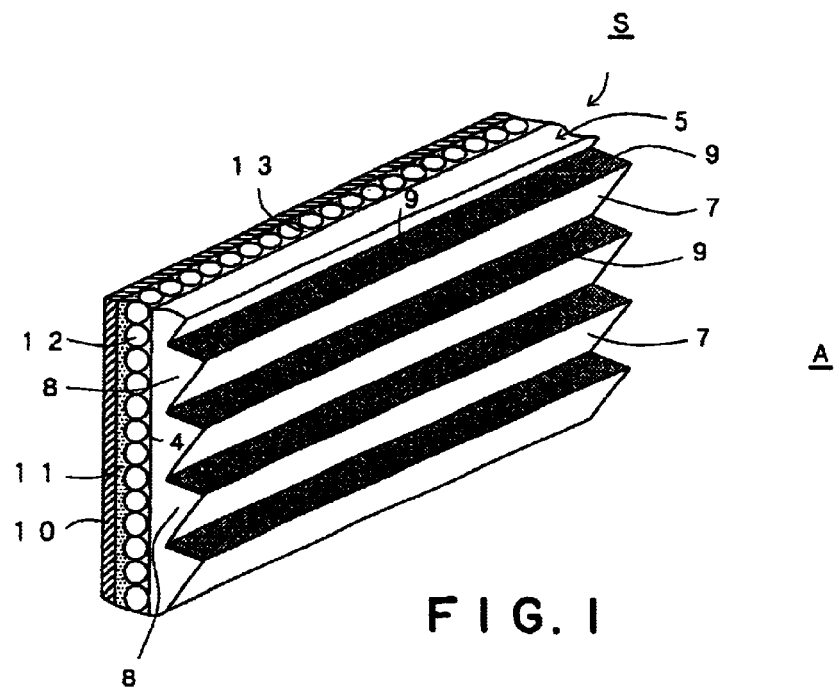
FIG. 1 is a perspective view of a front projection screen in a first embodiment according to the present invention.
Figure 2:
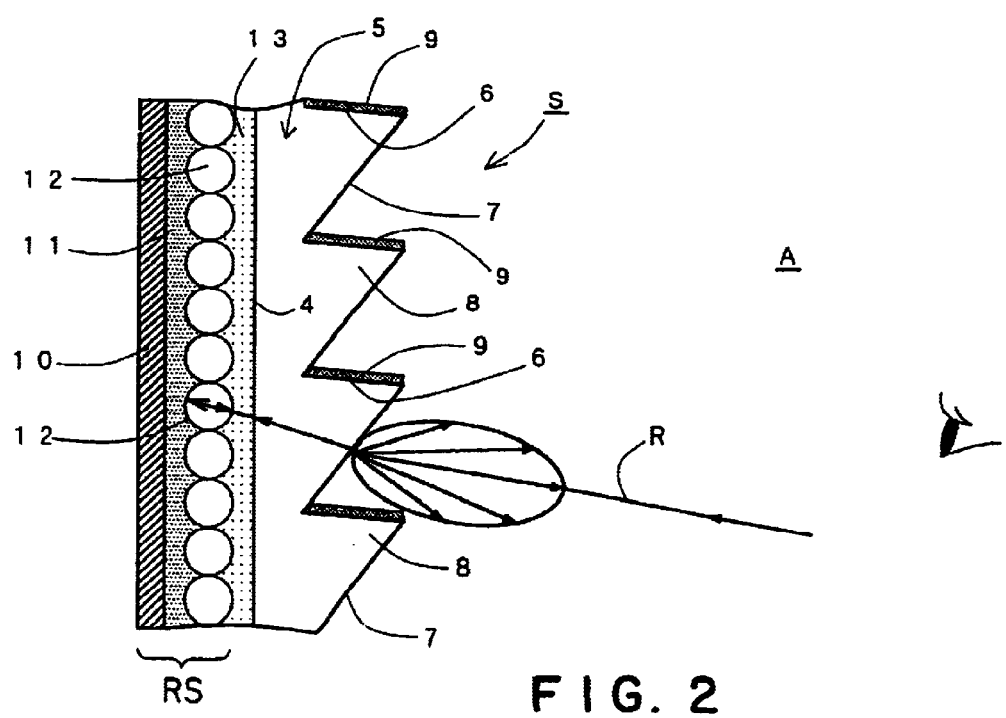
FIG. 2 is a longitudinal sectional view of the front projection screen shown in FIG. 1.

FIG. 1 is a perspective view of a front projection screen in a first embodiment according to the present invention, and FIG. 2 is a longitudinal sectional view of the front projection screen shown in FIG. 1.

The front projection screen in the first embodiment is a front projection screen of a light regression type that reflects projected imaging light so that the reflected imaging light travels in a direction opposite to the direction of travel of the projected imaging light. The reflected imaging light is caused to travel in a direction opposite to the direction of travel of the projected imaging light by the reflecting function of transparent glass beads 12, which will be described later.

As shown in FIGS. 1 and 2, a front projection screen S in a first embodiment according to the present invention has a front shading sheet 5 wholly formed of a transparent material and facing a viewing side A. The front shading sheet 5 is formed of a transparent, flexible synthetic resin, such as a urethane resin. The front shading sheet 5 is provided in its front surface facing the viewing side A with horizontal, parallel minute ridges 8 arranged at pitches of, for example, about 0.2 mm. Each minute ridge 8 has a triangular cross section, and has an upper side surface 6 and a lower side surface 7. The lower side surface 7 is steeper than the upper side surface 6. The upper side surface 6 may be horizontal. The upper side surface 6 is coated with a black shading layer 9. The front shading sheet 5 has a flat rear surface 4.

The rear surface 4, not facing the viewing side A, of the front shading sheet 5 is coated with a transparent filler layer 13 of a transparent filler having a refractive index equal or nearly equal to that of the transparent material of the front shading sheet 5. A reflecting screen RS is disposed behind the transparent filler layer 13.

The respective refractive indices of the front shading sheet 5 and the transparent filler layer 13 are in the range of, for example, 1.45 to 1.65, and one of the indices may be greater than the other. The reflecting screen RS has a front layer formed by embedding transparent glass beads 12 having a refractive index greater than that of the transparent filler layer 13 in a plane in a uniform density in the transparent filler layer 13. The filler forming the transparent filler layer 13 is, for example, a resin having a refractive index smaller than that of the transparent glass beads 12. The transparent glass beads 12 are formed of a material having a large refractive index. The diameters of the transparent glass beads 12 are in the range of about 30 to about 70 μm, and may be different from each other. The refractive index of the transparent glass beads 12 is in the range of, for example, 1.9 to 2.12. The transparent glass beads 12 arranged embedded in a plane in the transparent filler layer 13 is coated with a white, reflecting adhesive layer 11, and an opaque base sheet 10 impermeable to light is applied to the reflecting adhesive layer 11. The base sheet 10 may be a fiber-reinforced plastic sheet formed by impregnating a glass cloth with a resin, such as a PVC resin (polyvinyl chloride resin), a PET resin (polyethylene terephthalate resin) or a polycarbonate resin. The transparent glass beads 12 arranged in a plane, the reflecting adhesive layer 11 and the base sheet 10 constitute the reflecting screen RS. The reflecting adhesive layer 11 enhances the diffusion of light by the interface between the reflecting adhesive layer 11 and the transparent glass beads 12.

The front projection screen S has a shape generally resembling a sheet of composite construction. When the front shading sheet 5 is formed of a flexible material, the transparent filler layer 13, the reflecting adhesive layer 11 and the base sheet 10 are formed in flexible structures so that the front projection screen S is flexible. Any air layer is not formed in any parts of the front projection screen S, let alone between the front shading sheet 5 and the transparent filler layer 13.

Figure 3:
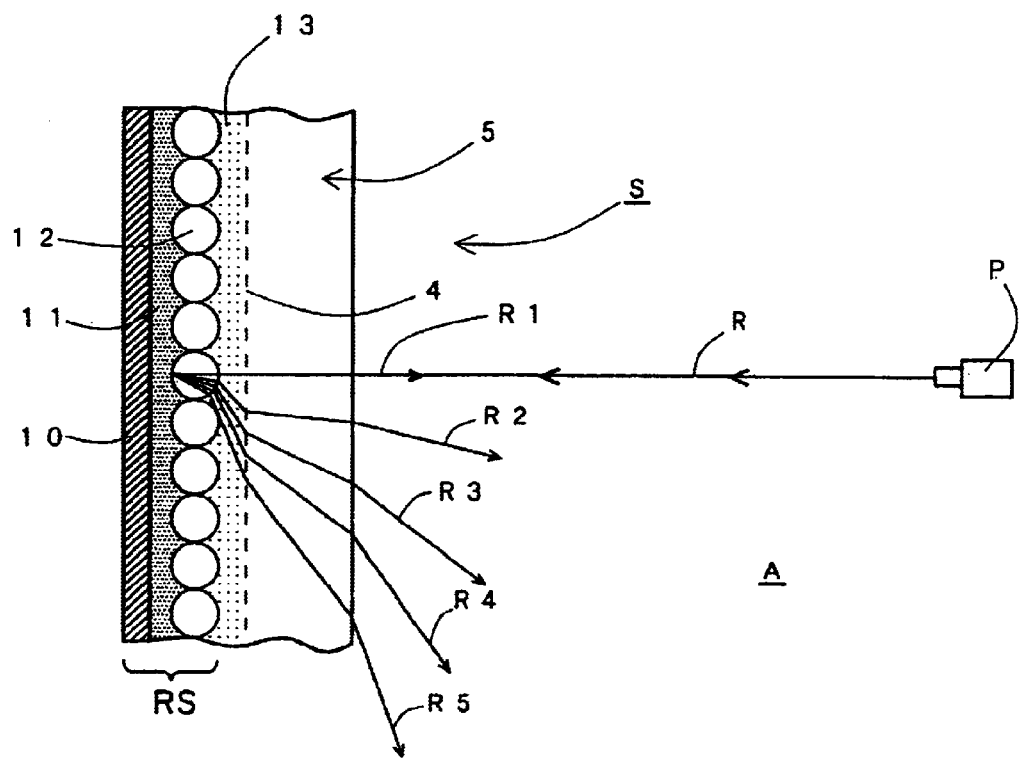
FIG. 3 is a cross-sectional view of the front projection screen shown in FIG. 1.

The function of the front projection screen S will be explained. Referring to FIG. 2, an imaging light ray R projected on the front projection screen S by a projector P (FIG. 3) placed on the viewing side of the front projection screen S penetrates through the transparent lower side surface 7 of the front shading sheet 5 into the front shading sheet 5, passes through the transparent filler layer 13 and permeates the transparent glass bead 12. Then, as shown in FIG. 3, the imaging light ray R is reflected in different directions by the rear surface of each transparent glass bead 12, the reflected imaging light beams travel forward through the transparent filler layer 13 and the front shading sheet 5, while the same are refracted at a boundary between the transparent glass bead 12 and the transparent filler layer 13 and at a boundary between the transparent filler layer 13 and the front shading sheet 5. Consequently, the reflected imaging light rays emerge from the front shading sheet 5 in different directions of the arrows R1 to R5, and a person on the viewing side A is able to see an image.

In this front projection screen S, the transparent filler layer 13 is in direct contact with the rear surface 4 of the front shading sheet 5, and the transparent filler layer 13 and the front shading sheet 5 are formed of materials respectively having refractive indices nearly equal to each other. Therefore, the transparent filler layer 13 and the front shading sheet 5 form a substantially homogeneous, continuous body. Thus, the emergence of the dark light rays Rt reflected rearward by the inner surface of the black shading layer 39, reflected by the rear surface 41 in a total reflection mode from parts horizontally apart from the center of the front shading sheet 35 of the front projection screen shown in FIGS. 14 and 15 can be prevented. According to the present invention, any dark light rays are not reflected forward by the rear surface 4 of the front shading sheet 5, light rays penetrate through the rear surface 4 into the transparent filler layer 13 and, consequently, any dark light rays emerge forward from the front shading sheet 5. Therefore, horizontal end parts of the image do not become dark.

Figure 4:
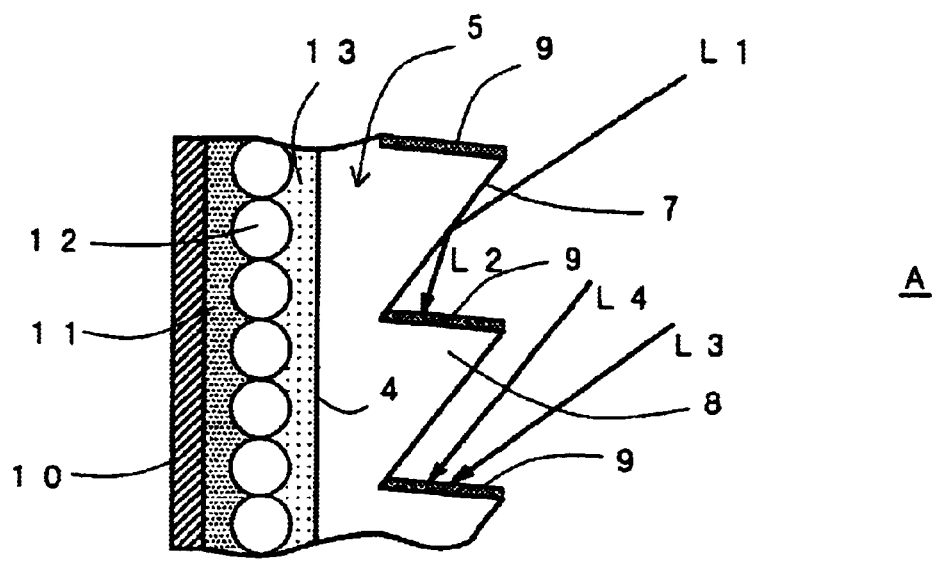
FIG. 4 is sectional view of assistance in explaining the function of a front shading sheet included in the front projection screen shown in FIGS. 1 to 3.

FIG. 4 shows the effect of the black shading layer 9 of the front shading sheet 5 on raising the black level of the image by absorbing external light, such as illuminating light or outdoor light, fallen on the front surface of the front shading sheet 5 facing the viewing side A. An external light ray L1 fallen on the transparent lower side surface 7 of the minute ridge 8 having a triangular cross section is reflected by the lower side surface 7, and the reflected external light ray L2 is absorbed by the shading layer 9. External light rays L3 and L4 reflected by the lower side surface 7 are absorbed by the shading layer 9 formed on the upper side surface of the underlying minute ridge 8. An external light ray L5 penetrated into the front shading sheet 5 is reflected by the rear surface 4 in a total reflection mode and is absorbed by the shading layer 9 formed on the upper side surface. An external light ray L6 fallen directly on the shading layer 9 is absorbed by the same shading layer 9.

Figure 5:
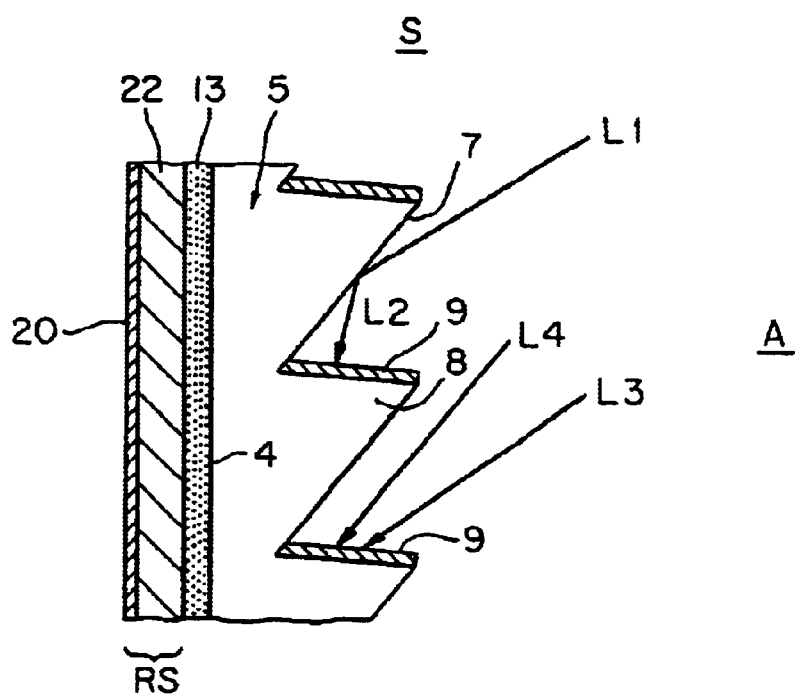
FIG. 5 is a perspective view of a front projection screen in a second embodiment according to the present invention.

FIG. 5 shows a front projection screen S in a second embodiment according to the present invention. The directionality of an imaging light reflected by the front projection screen S in the second embodiment, differing from that of the imaging light reflected by the front projection screen S of the light regression type shown in FIG. 1, does not have a strong dependence on the direction of the projected light.

The front projection screen S in the second embodiment has a front shading sheet 5 identical with that of the first embodiment shown in FIG. 2, and a reflecting screen RS different from that of the first embodiment shown in FIG. 2. As shown in FIG. 5, the reflecting screen RS has a white, mat sheet 22, i.e., a white sheet having a satin-finished surface, contiguous with the transparent filler layer 13 of the front shading sheet 5, and an opaque film 20 applied to the rear surface of the white, mat sheet 22. The white, mat sheet 22 is bonded to the rear surface of the front shading sheet 5 with the transparent filler layer 13.

A surface, contiguous with the transparent filler layer 13, of the white, mat sheet 22 is provided with minute irregularities. Fine particles are dispersed in the white, mat sheet 22 to enhance the diffusing effect of the white, mat sheet 22. The transparent filler layer 13, similarly to that of the first embodiment, is formed of a resin having a refractive index equal or nearly equal to that of the material of the front shading sheet 5. The white, mat sheet 22 has a thickness on the order of, for example, 0.1 mm. Preferably, the white, mat sheet 22 is formed of a synthetic resin having a high reflectivity, such as a polyester resin or a styrene resin. The opaque film 20 is impermeable to light and is a black coating or a metallic mirror film formed by vapor deposition, such as an aluminum mirror film.

Figure 14:
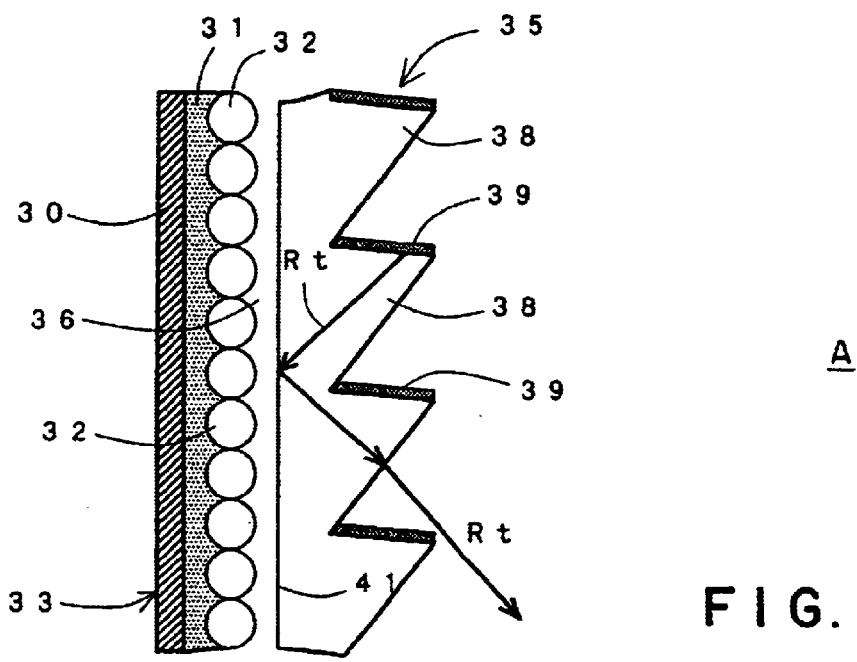
FIG. 14 is a longitudinal sectional view of a prior art front projection screen.
Figure 15:
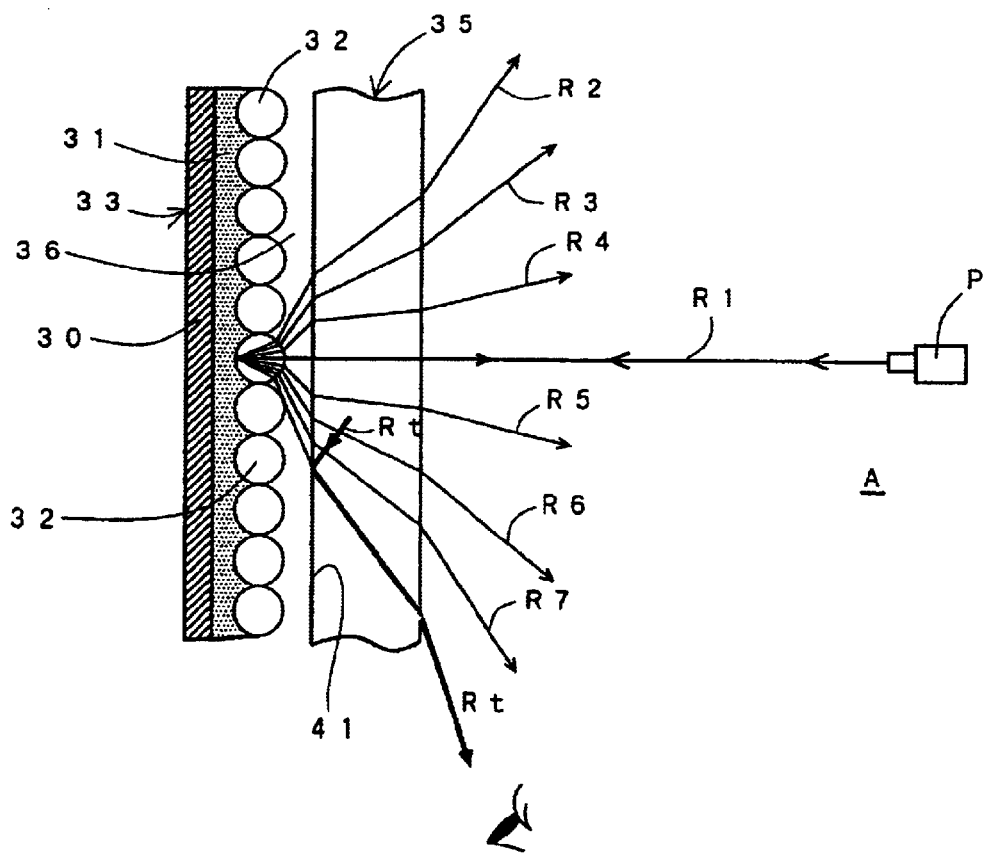
FIG. 15 is a cross-sectional view of the prior art front projection screen.

If an air layer is formed between the rear surface of the front shading sheet 5 and the white, mat sheet 22, and the front shading sheet 5 is not provided with the transparent filler layer 13, some light rays are reflected by the rear surface similarly to the light ray Rt reflected in a total reflection mode by the rear surface 41 as mentioned in the description of the conventional front projection screen in connection with FIGS. 14 and 15.

The front projection screen S in the second embodiment shown in FIG. 5 is the same in function and effect as the front projection screen S in the first embodiment shown in FIGS. 1 to 4. Dark light rays that travel rearward and fall on the rear surface 4 of the front shading sheet 5 penetrate into the transparent filler layer 13 instead of being reflected by the rear surface 4. Consequently, the dark light rays do not emerge forward from the front shading sheet 5, and hence horizontal end parts of the image displayed on the front projection screen S do not look dark.

Figure 6:
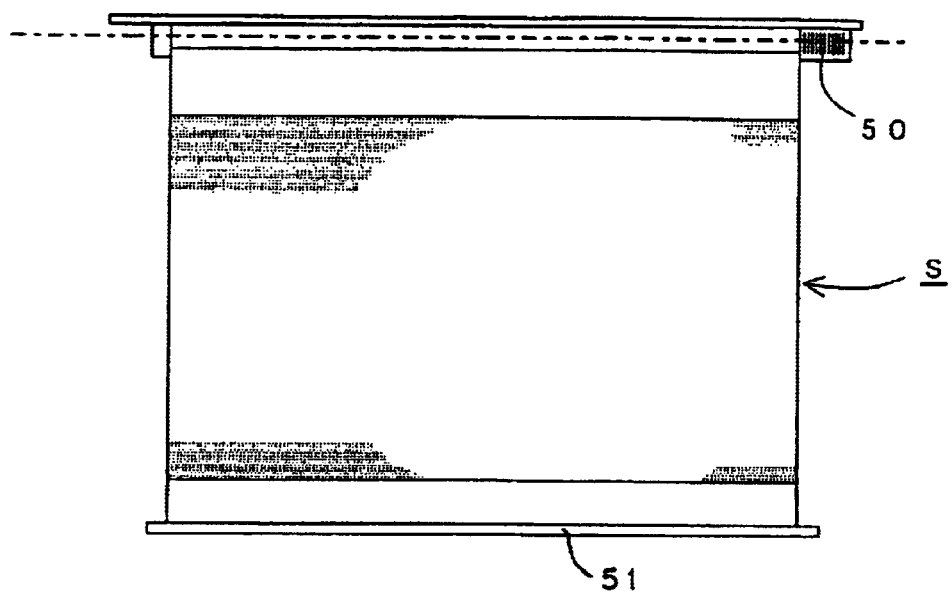
FIG. 6 is a front elevation of a front projection screen embodying the present invention.
Figure 7:
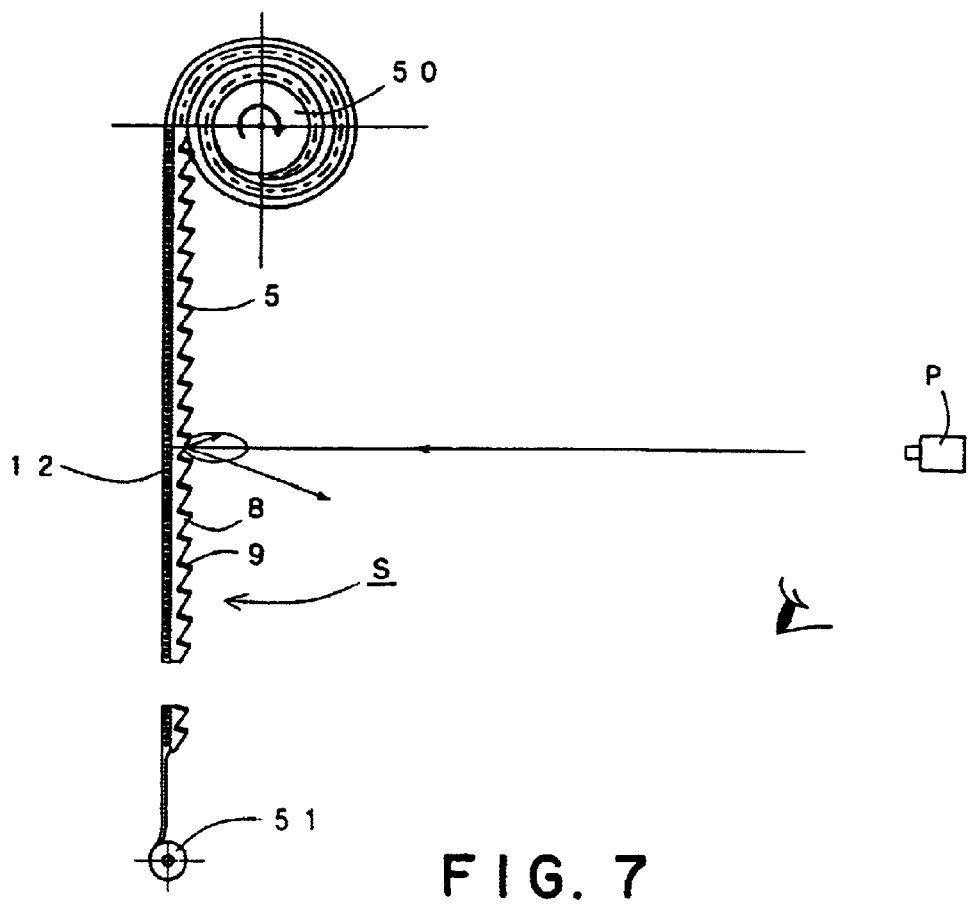
FIG. 7 is a longitudinal sectional view of the front projection screen shown in FIG. 6.

The front projection screen S shown in FIGS. 1 to 4, and the front projection screen S shown in FIG. 5 can be used in various modes. As shown in FIGS. 6 and 7, the front projection screen S formed in a flexible sheet is wound on a horizontal take-up spool 50, and is rolled out by pulling the same downward for use. In FIGS. 6 and 7, indicated at 51 is a weighting slat.

Figure 8:
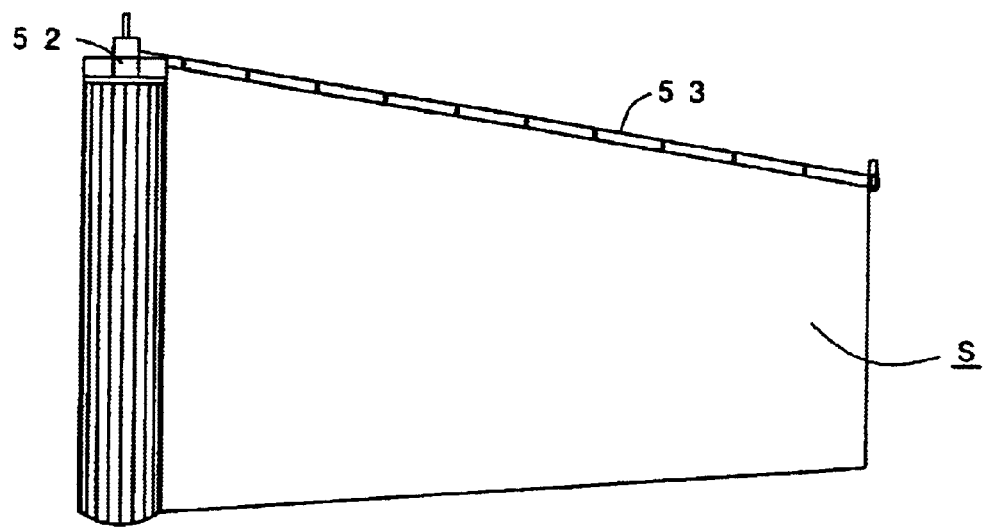
FIG. 8 is a perspective view of a front projection screen in a third embodiment according to the present invention.

Referring to FIG. 8, a front projection screen S in a third embodiment according to the present invention is formed in a flexible sheet and is wound on a vertical take-up spool 52. The front projection screen S is rolled out by pulling the same laterally. A long, flexible shape-retaining member 53 is attached to the upper edge of the front projection screen S for shape retention.

Figure 9:
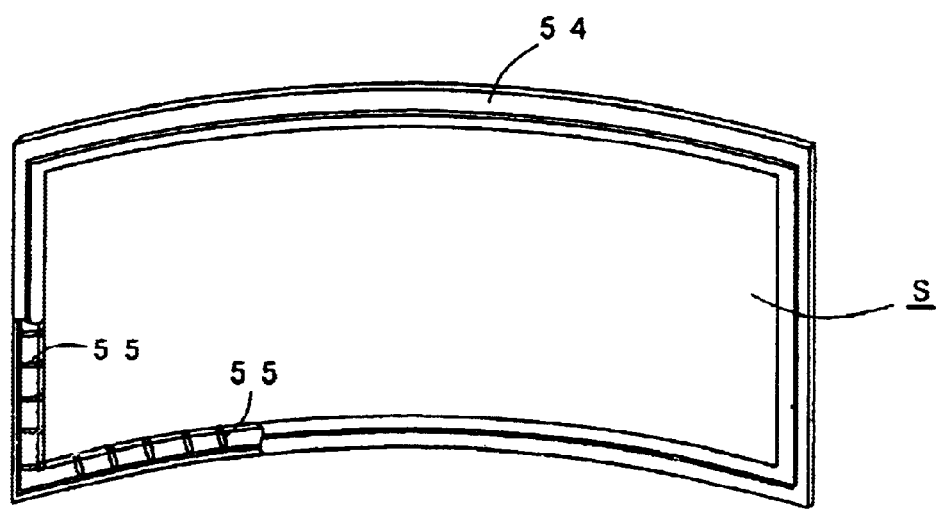
FIG. 9 is a perspective view of a front projection screen in a fourth embodiment according to the present invention.

Referring to FIG. 9, a front projection screen S in a fourth embodiment according to the present invention is formed in a rectangular, flexible sheet and is set in a rectangular frame 54. The front projection screen S is tensioned by a plurality of connecting members 55. The connecting members 55 may be connected to grommets or the like attached to the front projection screen S. In FIG. 9, the front projection screen S and the frame 54 are curved in a cylindrical shape.

The front projection sheet S does not necessarily need to be a flexible sheet, but may be a hard structure capable of shape retention.

Figure 10:
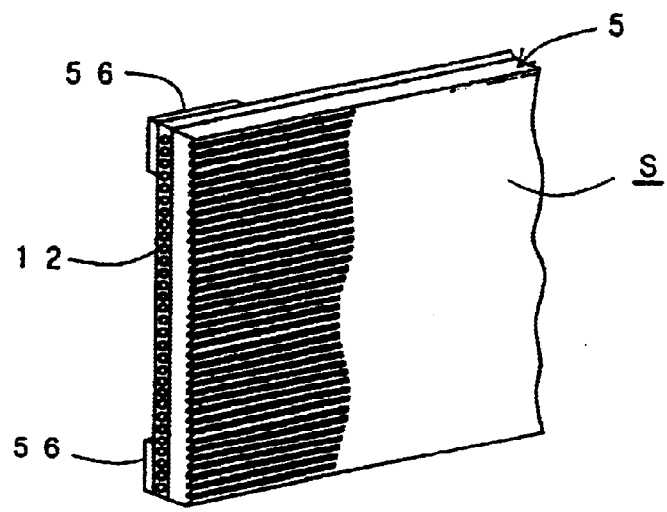
FIG. 10 is a perspective view of a front projection screen element in a fifth embodiment according to the present invention.
Figure 11:
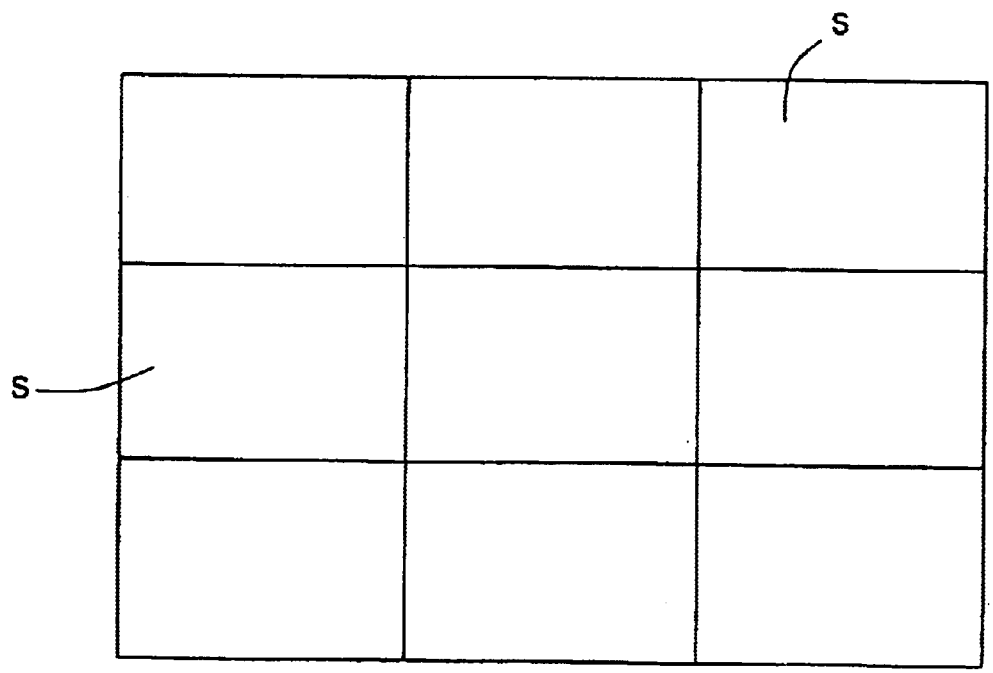
FIG. 11 is a view of assistance in explaining a large front projection screen formed by closely arranging a plurality of front projection screen elements identical with the front projection screen element shown in FIG. 10.

FIG. 10 shows a rectangular front projection screen S in a fifth embodiment according to the present invention provided on its rear surface with magnetic rubber pads 56, i.e., holding means. FIG. 11 shows a large screen formed by closely arranging a plurality of front projection screen elements S similar to the front projection screen S shown in FIG. 10 on a support structure, such as a magnetic board or a magnetic partition board, and magnetically attaching the plurality of front projection screen elements S to the support structure. This large screen can be readily assembled and disassembled.

FIG. 12 shows a rectangular, hard front projection screen S in a sixth embodiment according to the present invention capable of shape retention and provided on its rear surface with connecting tabs 58 and in its side with connecting holes. FIG. 13 is a view of assistance in explaining the construction of a large screen by closely arranging front projection screen elements S identical with the front projection screen S shown in FIG. 12. As shown in FIG. 13, the front projection screen elements S are closely arranged side by side, and the connecting tabs 58 of the front projection screen elements S are fitted in the connecting holes of the adjacent front projection screen elements S to construct a large screen. Thus, the large screen can be readily assembled and disassembled.

A apparent from the foregoing description, according to the present invention, the front projection screen includes the front shading sheet having the front surface facing the viewing side, provided with the plurality of horizontal, parallel, minute ridges having a triangular cross section, and each having the side surface coated with the shading layer; and the reflecting screen disposed opposite to the rear surface, facing the rear side opposite to the viewing side, of the front shading sheet; wherein the transparent filler layer formed of the material having a refractive index equal or nearly equal to that of the transparent material of the front shading sheet is sandwiched between the front shading sheet and the reflecting screen to construct the composite sheet such that any air layer is not formed at least between the front shading sheet and the transparent filler layer. Thus, the emergence of the dark light rays reflected rearward by the inner surface of the black shading layer, reflected by the rear surface in a total reflection mode from parts horizontally apart from the center of the front shading sheet of the front projection screen can be prevented. Therefore, horizontal end parts of an image displayed on the front projection screen do not become dark and the front projection screen of the present invention has a large viewing angle.

What is claimed is:

1. A front projection screen comprising:
   a front shading sheet facing a viewing side, wherein said front shading sheet is wholly formed of a transparent material, and includes a front surface facing the viewing side provided with a plurality of horizontal, parallel, minute ridges having a triangular cross section and each having a side surface coated with a shading layer; and
   a reflecting screen disposed opposite to a rear surface, and facing a rear side opposite to the viewing side of the front shading sheet;
   wherein a transparent filler layer formed of a material having a refractive index substantially equal to that of the transparent material of the front shading sheet is sandwiched between the front shading sheet and the reflecting screen to construct a composite sheet, wherein no air layer is formed between the front shading sheet and the transparent filler layer.

2. The front projection screen according to claim 1, wherein the reflecting screen comprises:
   an opaque base sheet impermeable to light;
   a white, reflecting, adhesive layer formed on a front surface, facing the viewing side of the base sheet; and
   a plurality of glass beads uniformly arranged on a front surface, facing the viewing side of the white reflecting adhesive layer and formed of a material having a refractive index greater than that of the material of the transparent filler layer.

3. The front projection screen according to claim 1, wherein the reflecting screen includes:
   an opaque base sheet, and
   a white, mat sheet applied to a surface, facing the viewing side of the opaque base sheet.

4. The front projection screen according to claim 1, wherein the composite sheet is flexible, and is capable of being rolled in a roll and of being rolled out for use.

5. The front projection screen according to claim 1, wherein the composite sheet is flexible, and is tautly set in a frame.

6. The front projection screen according to claim 1, further comprising a holding device capable of detachably holding the composite sheet on a wall, connected to the rear surface of the composite sheet; wherein a large screen can be constructed by closely arranging a plurality of front projection screens identical with the composite sheet on a wall.

7. The front projection screen according to claim 1, further comprising connecting tabs projecting from sides of the composite sheet and capable of connecting the composite sheet to another identical composite sheet; wherein a large screen can be constructed by closely arranging a plurality of front projection screens identical with the front projection screen having the composite sheet provided with the connecting projections, and connected together the plurality of front projection screens by the connecting tabs.

* * * * *